(12) United States Patent
Murphy et al.

(10) Patent No.: US 7,668,098 B2
(45) Date of Patent: Feb. 23, 2010

(54) METHOD AND APPARATUS FOR IMPROVING THE UPSTREAM DATA TRANSFER RATE FOR A CABLE MODEM

(75) Inventors: Kevin J. Murphy, Chandler, AZ (US); Tair Shapiro, Jerusalem (IL); Michael M. Stahl, Jerusalem (IL)

(73) Assignee: Intel Corporation, Santa Clara, CA (US)

(*) Notice: Subject to any disclaimer, the term of this patent is extended or adjusted under 35 U.S.C. 154(b) by 1266 days.

(21) Appl. No.: 10/600,519

(22) Filed: Jun. 19, 2003

(65) Prior Publication Data

US 2007/0280110 A1 Dec. 6, 2007

(51) Int. Cl.
*H04L 12/26* (2006.01)
(52) U.S. Cl. .................. 370/235; 370/412; 370/421; 370/437; 725/111
(58) Field of Classification Search ......... 370/412–421, 370/437; 725/110, 111
See application file for complete search history.

(56) References Cited

U.S. PATENT DOCUMENTS

| | | | |
|---|---|---|---|
| 6,236,678 B1 * | 5/2001 | Horton et al. ............... 375/222 |
| 6,931,659 B1 * | 8/2005 | Kinemura .................... 725/111 |
| 6,987,733 B2 * | 1/2006 | Mukouyama et al. ........ 370/236 |
| 7,165,140 B2 * | 1/2007 | Dandrea et al. .............. 711/114 |
| 2002/0065907 A1 | 5/2002 | Cloonan et al. |
| 2002/0114277 A1 * | 8/2002 | Kyusojin .................. 370/230.1 |
| 2003/0058795 A1 * | 3/2003 | Lansing et al. ............... 370/235 |
| 2003/0177502 A1 * | 9/2003 | Kolze et al. .................. 725/111 |
| 2003/0202525 A1 * | 10/2003 | Nagatomo ................... 370/411 |
| 2004/0100979 A1 * | 5/2004 | Mandin et al. ............... 370/402 |
| 2004/0179543 A1 * | 9/2004 | Carroll ....................... 370/431 |
| 2004/0244043 A1 * | 12/2004 | Lind et al. ................... 725/111 |
| 2006/0120282 A1 * | 6/2006 | Carlson et al. .............. 370/229 |

* cited by examiner

*Primary Examiner*—William Trost, IV
*Assistant Examiner*—Roberta A Shand
(74) *Attorney, Agent, or Firm*—Blakely, Sokoloff, Taylor & Zafman LLP

(57) ABSTRACT

Methods and apparatus for improving the upstream data transfer rate for a cable modem. A device that shares an upstream channel with other devices determines whether, based on particular data, an upstream channel data transfer rate can be improved over a current data transfer rate of a current upstream channel from the device to a remote system. If the upstream channel data rate can be improved, the device improves the upstream channel data transfer rate based, at least in part, on the particular data used to determine whether the data transfer rate can be improved.

24 Claims, 6 Drawing Sheets

METHOD AND APPARATUS FOR IMPROVING THE UPSTREAM DATA TRANSFER RATE FOR A CABLE MODEM

TECHNICAL FIELD

Embodiments of the invention are generally related to the field of cable modems and, in particular, to improving the upstream data transfer rate for a cable modem.

BACKGROUND

A modem converts digital data from a digital device, e.g., an electronic system such as a desktop or laptop computer, or a set-top box for a television, to analog signals for transmission to another digital device. The modem also converts incoming analog signals into digital data for the digital device. A cable modem transmits and receives analog signals over a cable television company's coaxial cable. The cable modem may be an external device or integrated within the digital device.

A cable modem exchanges digital data with a cable modem termination system (CMTS) at the cable television company's office. A CMTS receives data from a cable modem coupled with (or integrated within) a user's customer premise equipment (CPE), e.g., a laptop computer, desktop computer, or television set-top box. The CMTS receives data from the cable modem via a channel in the cable commonly referred to as an upstream channel. The CMTS transmits the received data across a network, e.g., a wide area network, such as the Internet, to a server or another user's CPE, for example. Conversely, when the CMTS receives data from the network, it transmits the data to the cable modem via a channel in the cable commonly referred to as a downstream channel.

There are typically a number of upstream channels between a cable modem and a CMTS. Each cable modem in the cable network is assigned to one upstream channel, which is shared by other cable modems assigned to that upstream channel (by contrast, in a telephone network, each modem is assigned its own separate channel). The downstream channel is shared by all cable modems in the cable network. Thus, data on a downstream channel is identified as intended for a particular cable modem, so that each cable modem can retrieve from the downstream channel the data that is intended for that cable modem.

Data transfer rates on an upstream channel may vary based on, among other things, the number of cable modems using the channel at a particular time. As the number of users increases, there is less available bandwidth for each cable modem on the upstream channel, and thus the data transfer rate decreases. A cable modem is unable to determine when an upstream data transfer rate has decreased, or to improve the data transfer rate. The CMTS may be able to determine that the upstream data transfer rate has decreased, but has limited ability to improve the data transfer rate. The relative inability to improve the upstream data transfer rate may result in a frustrating network experience for a user, whose cable modem is competing with other cable modems for bandwidth to get the user's data to the CMTS as quickly as possible.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION OF THE INVENTION

Methods and apparatus for improving the upstream data transfer rate for a cable modem are described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

A device that shares an upstream channel with other devices determines whether, based on particular data, an upstream channel data transfer rate can be improved over a current data transfer rate of a current upstream channel from the device to a remote system. If the upstream channel data rate can be improved, the device improves the upstream channel data transfer rate based, at least in part, on the particular data used to determine whether the data transfer rate can be improved.

Figure 1:
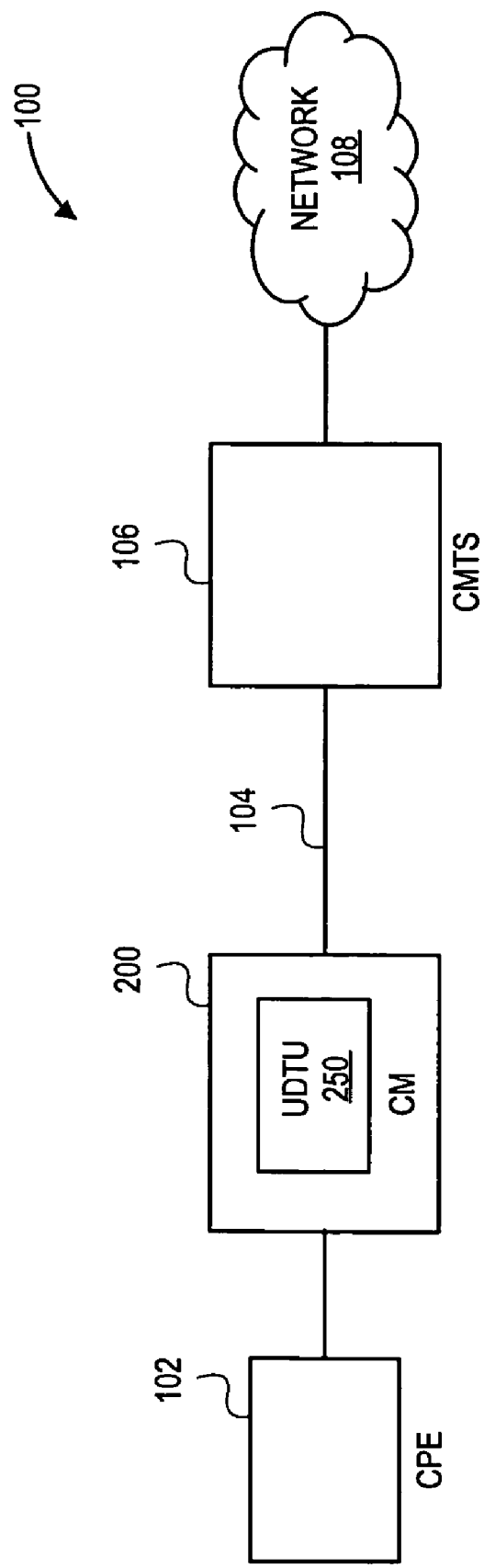
FIG. 1 is a block diagram illustrating an example embodiment of a cable network.

FIG. 1 is a block diagram illustrating an example embodiment of a cable network. Although embodiments of the invention are described in terms of a cable network, embodiments of the invention may be practiced in any data transmission network in which a device shares an upstream channel with other devices. Cable network 100 includes customer premise equipment (CPE) 102. CPE 102 may be any device capable of connecting with cable network 100, e.g., a personal computer, a personal digital assistant (PDA), a laptop or palmtop computer, a computer system, a network access device or a television set-top box.

Cable network 100 further includes cable modem (CM) 200 coupled with CPE 102. Although embodiments of the invention are described in terms of a cable modem, embodiments of the invention may be practiced with any device that shares an upstream channel with other devices. As used herein, CM 200 is intended to represent a broad range of cable modems. The integration of upstream channel data transfer rate unit (UTRU) 250 in CM 200 enables CM 200 to improve an upstream channel data transfer rate, as described more fully below, which conventional cable modems cannot do. Because CM 200 otherwise represents any number of cable modems, the architectural details of CM 200, except with regard to UTRU 250 and the elements described below in connection with FIG. 2, need not be described further. Although shown in FIG. 1 as being external to CPE 102, CM 200 may be integrated within CPE 102.

Cable network 100 further includes cable transmission medium 104, referred to herein as cable 104, coupled with CM 200, to carry data to and from CM 200. Cable 104 may be any cable known in the art, including, but not limited to, a coaxial cable or a fiber optics cable, having one or more upstream channels.

Cable network 100 further includes CMTS 106, coupled with CM 200 via cable 104. CMTS 106 receives data from CPE 102 via CM 200 on an upstream channel in cable 104, and transmits data to CPE 102 via CM 200 on a downstream channel in cable 104. Although embodiments of the invention are described in terms of a CMTS, any other network component, e.g., a server, other users' CPE, a router, a switch, etc., that can communicate with CM 200 using upstream and downstream channels, may be used.

CMTS 106 can be coupled with network 108, e.g., a local area network, a personal area network, a wide area network, such as the Internet, or a metropolitan area network. CMTS 106 may receive data from CPE 102 via CM 200 and forward the data across network 108 to a server or another user's CPE, for example. Similarly, CMTS 106 may receive data from network 108 and forward the data to CPE 102 via CM 200.

Figure 2:
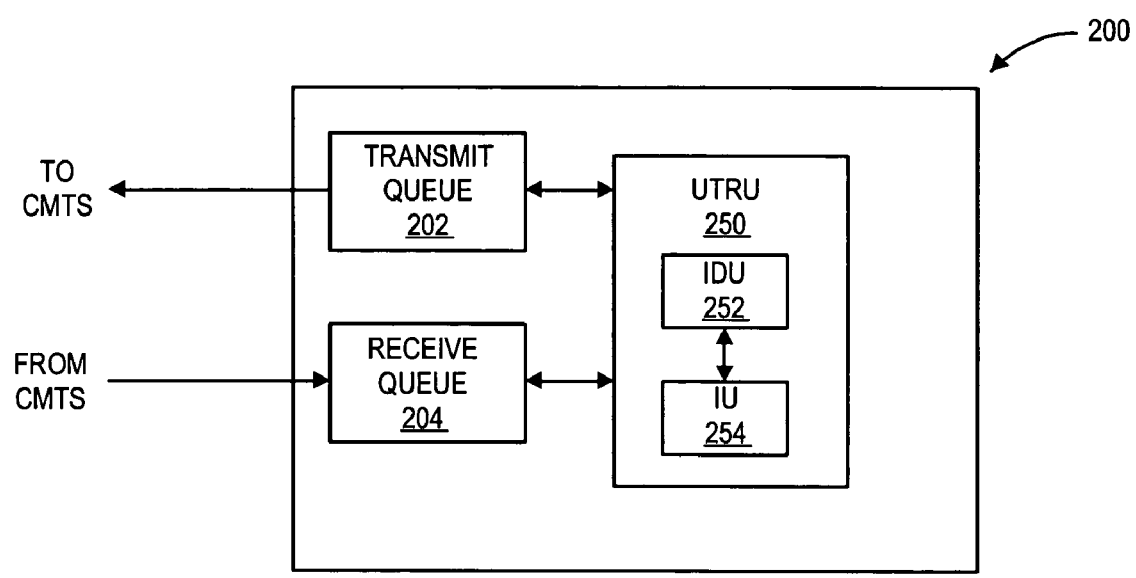
FIG. 2 is a block diagram illustrating an example embodiment of a cable modem.

FIG. 2 is a block diagram illustrating an example embodiment of a cable modem. CM 200 includes transmit queue 202, which buffers data to be transmitted to CMTS 106. CM 200 further includes receive queue 204, which buffers data received from CMTS 106. Data to be transmitted from transmit queue 202 to CMTS 106 is generally referred to herein as a packet, as is data received in receive queue 204 from CMTS 106. The packet may be fixed length or variable length.

CM 200 further includes UTRU 250, coupled with transmit queue 202 and receive queue 204. UTRU 250 includes improvement determination unit (IDU) 252. As explained in more detail below, IDU 252 enables CM 200 to determine whether a current upstream channel data transfer rate can be improved. UTRU 250 further includes improvement unit (IU) 254 coupled with IDU 252. As explained in more detail below, IU 254 enables CM 200 to improve an upstream channel data transfer rate, if IDU 252 determines that the current upstream channel data transfer rate can be improved.

UTRU 250 enables CM 200 to determine whether an upstream channel data transfer rate can be improved. If so, UTRU 250 enables CM 200 to improve the data transfer rate, thereby improving a user's networking experience. Consequently, CM 200 is able to perform functions that conventional cable modems cannot perform.

UTRU 250, IDU 252 and/or IU 254 may be implemented in software, e.g., as machine-readable instructions or machine-accessible instructions that, when executed, cause CM 200 to improve upstream data transfer rates in the manner described herein, in digital hardware logic, e.g., as an application specific integrated circuit (ASIC), or as a combination of software and hardware. In addition, although described herein as separate functional elements, IDU 252 and IU 254 may be combined into a single multifunctional element that performs the functions of IDU 252 and IU 254.

Figure 3:
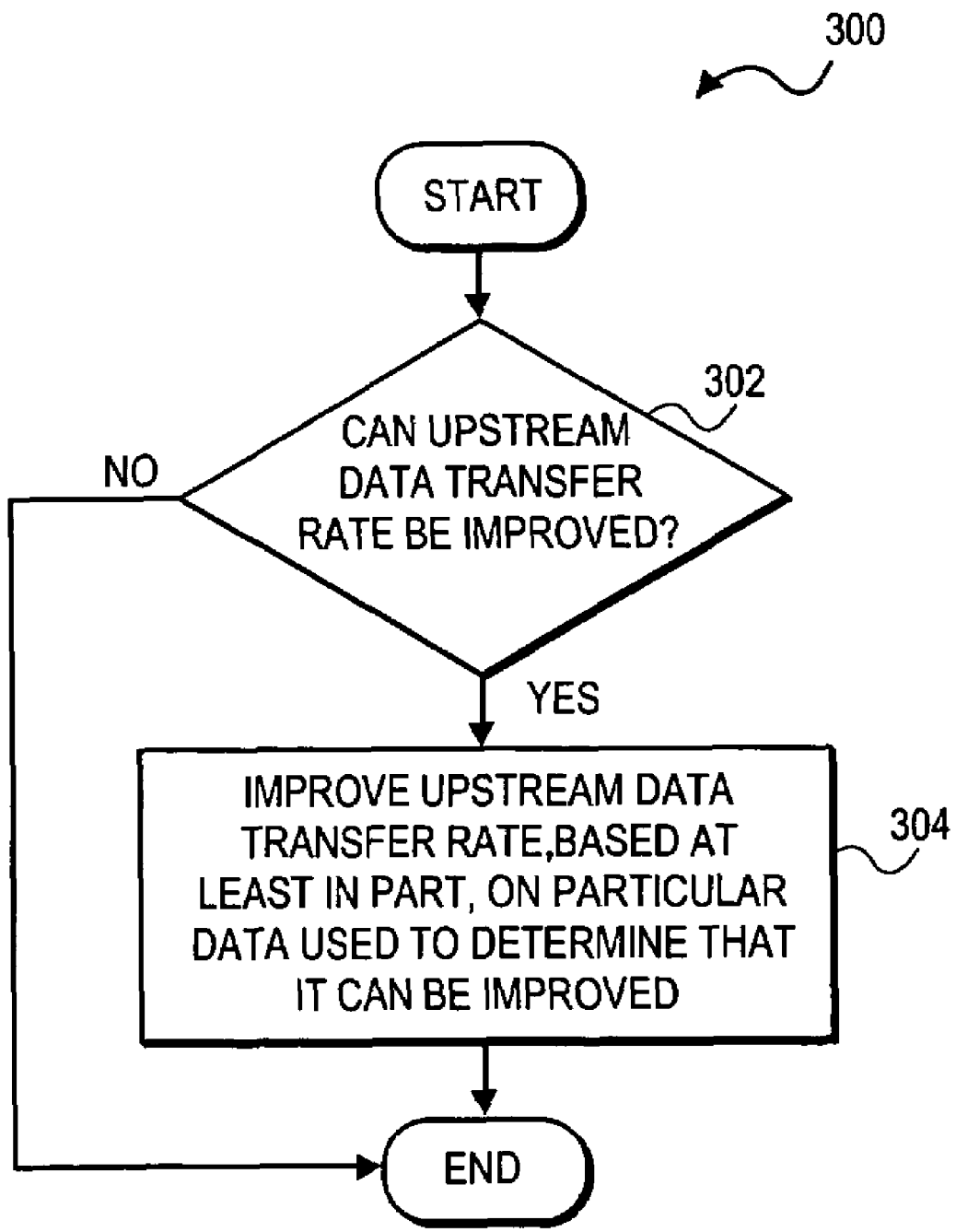
FIG. 3 is a flow chart illustrating an example embodiment of a method of improving the upstream data transfer rate for a cable modem.

FIG. 3 is a flow chart illustrating an example embodiment of a method of improving the upstream data transfer rate for a cable modem. At 302 of method 300, IDU 252 determines whether, based at least in part on particular data, an upstream channel data transfer rate can be improved over a current data transfer rate in a current upstream channel. IDU 252 may make this determination continuously, on a periodic basis, on a random basis, or a combination thereof. If IDU 252 determines that the data transfer rate can be improved, at 304, IU 254 improves the data transfer rate based, at least in part, on the particular data IDU 252 used to determine whether the data transfer rate can be improved.

As described below in connection with FIG. 4, the particular data used to determine whether the upstream data transfer rate can be improved may be the capacity of transmit queue 202. Alternatively, as described below in connection with FIG. 5, the particular data used to determine whether the upstream data transfer rate can be improved may be bandwidth information transmitted from CMTS 106.

Figure 4:
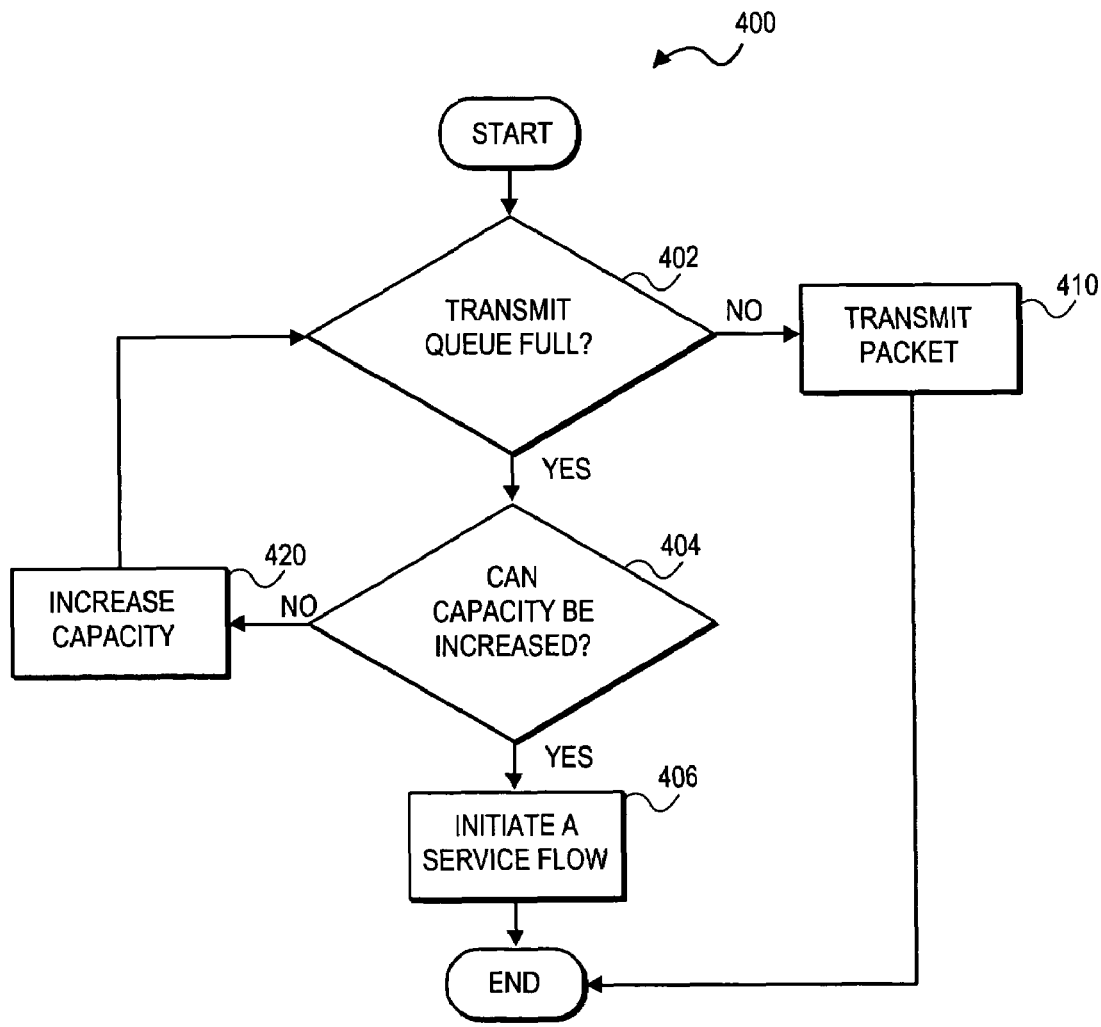
FIG. 4 is a flow chart illustrating an example embodiment of a method of improving an upstream data transfer rate based on the capacity of a transmit queue.

FIG. 4 is a flow chart illustrating an example embodiment of a method of improving an upstream data transfer rate based on the capacity of a transmit queue. At 402 of method 400, IDU 254 determines whether transmit queue 202 is full. A full transmit queue 202 may indicate that packets are not being transmitted on time, possibly because a large number of users are on the system, thereby reducing available bandwidth and the data transfer rate in the upstream channel. Specifically, if the data transfer rate is reduced, a packet in transmit queue 202 scheduled to be transmitted during a particular time slot is not transmitted on time, and waits for another time slot, which causes transmit queue 202 to fill up. Eventually, if another packet arrives in transmit queue 202 when it is full, CM 200 drops a packet that missed its time slot.

In one embodiment, IDU 254 determines the number of packets in transmit queue 202 and examines a predetermined value that indicates the capacity of transmit queue 202, to determine whether transmit queue 202 is full. In another embodiment, IDU 254, in order to determine whether transmit queue 202 is full, determines whether data, referred to herein as packet receipt data, indicates that a receiving device on network 108, e.g., a server or other CPE, failed to receive a packet previously transmitted from CM 200.

Packet receipt data that indicates failure to receive a packet is referred to herein as a receipt failure indicator. In one embodiment, the receipt failure indicator is a selective acknowledgement (SACK) packet. A SACK packet is part of the transmission control protocol (TCP), and enables a receiver to specify a packet that has not been received from among a group of packets transmitted across a network. See, e.g., Request for Comments (RFC) 793, Transmission Control Protocol, Defense Advanced Research Projects Agency (DARPA) Internet Program Protocol Specification, September 1981. TCP is a set of rules for transmitting packets between computers systems over the Internet. When data is transmitted over the Internet, the sender uses TCP to divide the data into packets and numbers the packets for transmission across the network. When the packets arrive at a receiver, the receiver uses TCP to reassemble the packets into the original data.

If the receiver fails to receive one of the packets, the receiver transmits a SACK packet to the sender to indicate which packets were not received. IDU 254 can parse packet receipt data from CMTS 106 and examine a field in the packet header to determine whether the packet receipt data is a SACK packet. Although a SACK packet is an example of a receipt failure indicator, method 400 is not limited to SACK packets.

If the packet receipt data is a receipt failure indicator, IDU 252 determines whether the number of receipt failure indicators in receive queue 204 exceeds an acceptable number of receipt failure indicators, e.g., according to a parameter set by a user. Having a large number of receipt failure indicators in receive queue 204 typically means that transmit queue 202 is full, because CM 200 is receiving new packets and dropping packets that missed their time slots, which therefore are not being received at the receiver. Conversely, if there is not a large number of receipt failure indicators, IDU 254 may determine that transmit queue 202 is not full.

At 402, if IDU 254 determines that transmit queue 202 is not full, at 410 CM 200 transmits a packet to CMTS 106. However, if transmit queue 202 is full, at 404, IDU 254 determines whether the capacity of transmit queue 202, and thus the number of packets that may be held in transmit queue 202, can be increased. If the capacity of transmit queue 202 can be increased, at 420 IU 254 increases the capacity of transmit queue 202, e.g., by increasing the value of a variable that determines the size of transmit queue 202. Increasing the capacity of transmit queue 202 may enable a packet that missed its time slot to remain in transmit queue 202 long enough for transmission in another time slot. A new packet arriving in transmit queue 202 will not cause CM 200 to drop a packet that missed its time slot, since there is more space for packets in transmit queue 202.

However, if the capacity of transmit queue 202 cannot be increased, e.g., because the capacity is already at the maximum capacity, at 406, IU 254 initiates a service flow in the upstream channel. The Data-Over-Cable Service Interface Specifications (DOCSIS) define interface standards for cable modems in high-speed data-over-cable systems. See, e.g., Cable Television Laboratories, Inc., "Data-Over-Cable Service Interface Specifications, Radio Frequency Specification SP-RFIv1.1-I08-020301," Mar. 1, 2002. In DOCSIS, a service flow is a unidirectional path from CM 200 to CMTS 106 on an upstream channel. Typically, there is one service flow between CM 200 and CMTS 106. However, CM 200 may request that CMTS 106 create an additional service flow, thereby granting CM 200 additional bandwidth for transmitting data packets. Although method 400 is described in terms of improving an upstream channel data transfer rate based on service flows, method 400 may be used with any mechanism that enables IU 254 to increase the number of paths in an upstream channel.

Figure 5:
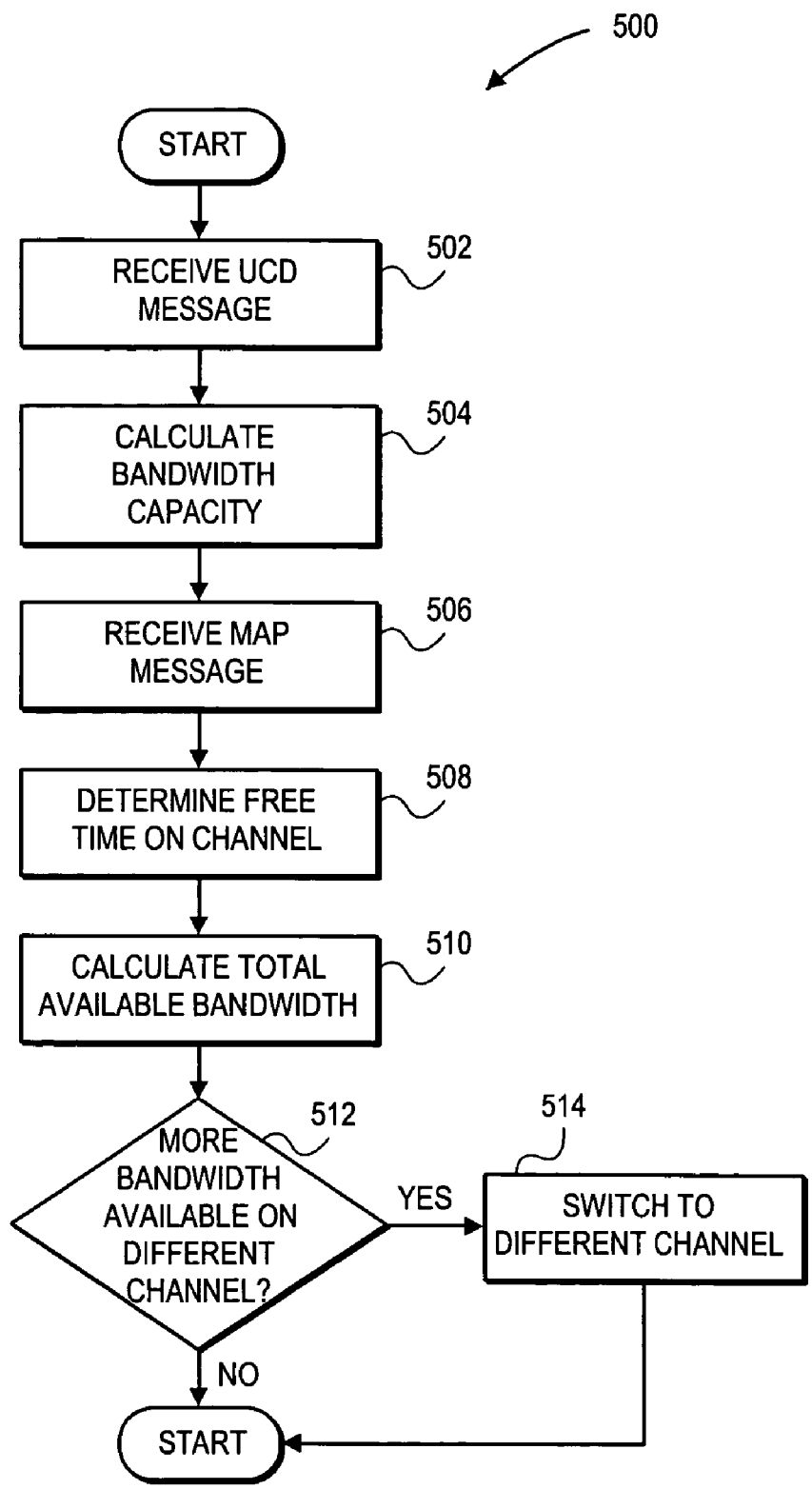
FIG. 5 is a flow chart illustrating an example embodiment of a method of improving an upstream data transfer rate based on upstream channel bandwidth data.

FIG. 5 is a flow chart illustrating an example embodiment of a method of improving the upstream data transfer rate based on upstream channel bandwidth data. At 502 of method 500, CM 200 receives upstream channel descriptor (UCD) messages from CMTS 106 for all upstream channels.

In DOCSIS, a UCD message defines the characteristics of an upstream channel. A separate UCD message is transmitted, via the downstream channel, for each active upstream channel. Among other data, a UCD message includes an identifier of the upstream channel, which identifies the upstream channel to which the UCD message refers, and a symbol rate, which indicates the number of symbols CMTS 106 transmits per second.

In addition, the UCD message indicates a modulation type, e.g., quadrature phase-shift keying (QPSK) or quadrature amplitude modulation (16QAM). Each modulation type has an associated number of bits included in each symbol, e.g., QPSK has two bits per symbol, while 16QAM has four bits per symbol. Thus, the bandwidth capacity varies among upstream channels based on the type of modulation used in the channel. For example, all else being equal, an upstream channel on which 16QAM is used has twice as much bandwidth capacity that an upstream channel on which QPSK is used, because there are twice as many bits per symbol (four versus two) with 16QAM. Based on the data in the UCD message, at 504 IDU 252 calculates the bandwidth capacity of an upstream channel, in bits per second, as the product of the symbol rate (symbols per second) and the bits per symbol associated with the modulation type.

At 506, CM 200 receives upstream bandwidth allocation map (MAP) messages from CMTS 106 for each upstream channel. In DOCSIS, a MAP message describes, for some time interval, the time slots granted to each cable modem for transmitting data on the upstream channel, and thus indicates the current usage of upstream channel bandwidth. A separate MAP message is transmitted, via the downstream channel, for each active upstream channel. Among other data, a MAP message includes an identifier of the upstream channel to which the message refers, and data grant information, which defines the CM (identified by a number) that may transmit in a given time slot, when it may transmit, and for how long. Based on the MAP, at 508 IDU 252 determines the amount of free time on the channel, i.e., time slots not allocated to CMs.

At 510, IDU 252 calculates the amount of bandwidth currently available on each upstream channel. For example, using the bandwidth capacity calculated from the UCD message and the total available free time determined from the MAP message, IDU 252 determines the percentage of unused bandwidth on an upstream channel.

At 512, IDU 252 determines whether a different upstream channel has more available bandwidth than the upstream channel CM 200 is currently using. If another channel has more available bandwidth, at 514, IU 254 switches to that channel. However, if no other channel has more available bandwidth, CM 200 remains on its current upstream channel.

Although method 500 is described in terms of using UCD and MAP messages in the DOCSIS standard to determine that data transfer rates can be improved, method 500 may be used with any data that enables CM 200 to calculate the total available bandwidth of an upstream channel based on the total capacity of an upstream channel and the total bandwidth being used or unused.

Although method 400 and method 500 are described as separate alternatives for improving data transfer rates, CM 200 may use both methods 400 and 500 in conjunction with each other. For example, CM 200 may determine that transmit queue 202 is full, and thus that the data transfer rate can be improved, as described previously. Thus, CM 200 may use UCD and MAP messages to calculate the bandwidths of other upstream channels, and determine that no other upstream channel has more available bandwidth than the current upstream channel, as described previously. In that case, rather than switching to another upstream channel, CM 200 may increase the capacity of transmit queue 202, and/or initiate another service flow in the upstream channel, as explained previously.

For purposes of illustration and ease of explanation, methods 300, 400 and 500 have been described in terms of a cable modem and a CMTS. However, any device that shares with other devices an upstream channel from the device to a remote system may be used.

FIGS. 3-5 describe example embodiments of the invention in terms of a method. However, one should also understand it to represent a machine-accessible medium having recorded, encoded or otherwise represented thereon instructions, routines, operations, control codes, or the like, that when executed by or otherwise utilized by an electronic system, cause the electronic system to perform the methods as described above or other embodiments thereof that are within the scope of this disclosure.

Figure 6:
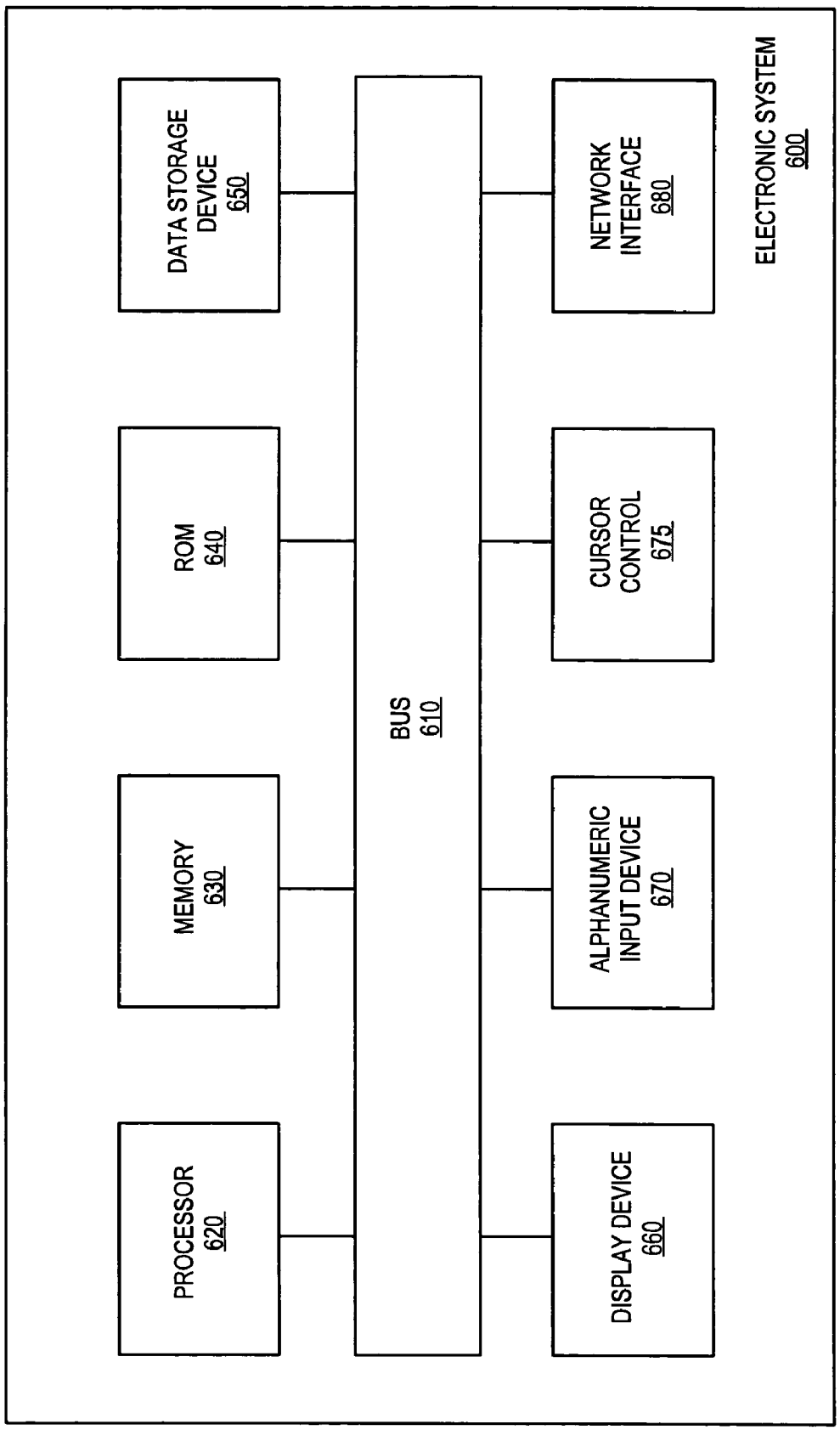
FIG. 6 is a block diagram illustrating one embodiment of an electronic system.

FIG. 6 is a block diagram illustrating one embodiment of an electronic system. The electronic system is intended to represent a range of electronic systems, including, for example, a personal computer, a personal digital assistant (PDA), a laptop or palmtop computer, a cellular phone, a computer system, a network access device, etc. Other electronic systems can include more, fewer and/or different components. The methods of FIGS. 3-5 can be implemented as sequences of instructions executed by the electronic system. The sequences of instructions can be stored by the electronic system, or the instructions can be received by the electronic system (e.g., via a network connection). The electronic system can be coupled to a wired network, e.g., via a cable such as a coaxial cable, a fiber optics cable, or a twisted-pair phone line, a wireless network, e.g., via radio or satellite signals, or a combination thereof.

Electronic system 600 includes a bus 610 or other communication device to communicate information, and processor 620 coupled to bus 610 to process information. While electronic system 600 is illustrated with a single processor, electronic system 600 can include multiple processors and/or co-processors.

Electronic system 600 further includes random access memory (RAM) or other dynamic storage device 630 (referred to as memory), coupled to bus 610 to store information and instructions to be executed by processor 620. Memory 630 also can be used to store temporary variables or other intermediate information while processor 620 is executing instructions. Electronic system 600 also includes read-only memory (ROM) and/or other static storage device 640 coupled to bus 610 to store static information and instructions for processor 620. In addition, data storage device 650 is coupled to bus 610 to store information and instructions. Data storage device 650 may comprise a magnetic disk (e.g., a hard disk) or optical disc (e.g., a CD-ROM) and corresponding drive.

Electronic system 600 may further comprise a display device 660, such as a cathode ray tube (CRT) or liquid crystal display (LCD), to display information to a user. Alphanumeric input device 670, including alphanumeric and other keys, is typically coupled to bus 610 to communicate information and command selections to processor 620. Another type of user input device is cursor control 675, such as a mouse, a trackball, or cursor direction keys to communicate direction information and command selections to processor 620 and to control cursor movement on display device 660. Electronic system 600 further includes network interface 680 to provide access to a network, such as a local area network or wide area network.

Instructions are provided to memory from a machine-accessible medium, or an external storage device accessible via a remote connection (e.g., over a network via network interface 680) providing access to one or more electronically-accessible media, etc. A machine-accessible medium includes any mechanism that provides (i.e., stores and/or transmits) information in a form readable by a machine (e.g., a computer). For example, a machine-accessible medium includes RAM; ROM; magnetic or optical storage medium; flash memory devices; etc.

In alternative embodiments, hard-wired circuitry can be used in place of or in combination with software instructions to implement the embodiments of the present invention. Thus, the embodiments of the present invention are not limited to any specific combination of hardware circuitry and software instructions.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the embodiments of the invention. The specification and drawings are, accordingly, are to be regarded in an illustrative rather than a restrictive sense.

What is claimed is:

1. A method, comprising:
calculating, by a device that shares one or more upstream channels with other devices, an available bandwidth of a first upstream channel based at least on upstream channel bandwidth data transmitted from a remote system, wherein the remote system comprises a cable modem termination system (CMTS);
determining by the device, whether based, at least in part on particular data, an upstream channel data transfer rate can be improved over a current data transfer rate of the first upstream channel from the device to the remote system, wherein the particular data comprise the device's transmit queue capacity data, the upstream channel bandwidth data transmitted from the remote system, or both; wherein determining whether the transmit queue capacity data indicates that the transmit queue is full comprises:
monitoring a first number of receipt failure indicators transmitted from the CMTS;
comparing the first number of receipt failure indicators to a second number; and
indicating the transmit queue is full if the first number is larger than the second number; and
improving by the device, if the upstream channel data transfer rate can be improved, the upstream channel data transfer rate based, at least in part, on the particular data.

2. The method of claim 1, wherein the device that shares the one or more upstream channels with other devices comprises a cable modem.

3. The method of claim 1, wherein determining whether the upstream channel data transfer rate can be improved comprises determining whether the transmit queue capacity data indicates that the transmit queue is full.

4. The method of claim 3, wherein improving by the cable modem the upstream channel data transfer rate based, at least in part, on the particular data comprises:
if the transmit queue capacity data indicates that the transmit queue is full:
determining whether a capacity of the transmit queue is at a maximum capacity; and
increasing the capacity of the transmit queue, if the capacity is not at the maximum capacity.

5. The method of claim 3, wherein improving by the cable modem the upstream channel data transfer rate based, at least in part, on the particular data comprises:
if the transmit queue capacity data indicates that the transmit queue is full:
determining whether a capacity of the transmit queue is at a maximum capacity; and
initiating a service flow, if the capacity of the transmit queue is at the maximum capacity.

6. The method of claim 1, wherein the bandwidth data comprises an upstream channel descriptor (UCD) message and an upstream bandwidth allocation map (MAP) message.

7. The method of claim 6, wherein determining whether the upstream channel data transfer rate can be improved comprises:
performing by the cable modem, operations of
receiving the UCD message from the CMTS for each upstream channel, including the first upstream channel the cable modem is using;
receiving the MAP message from the CMTS for each upstream channel;
calculating an available bandwidth of each upstream channel based, at least in part, on the UCD message and the MAP message; and determining whether a different upstream channel has more bandwidth that the first upstream channel.

8. The method of claim 7, wherein improving by the cable modem the upstream channel data transfer rate based, at least in part, on the particular data comprises switching to the different upstream channel, if the different upstream channel has more available bandwidth than the first upstream channel.

9. The method of claim 6, further comprising performing by the cable modem operations of
receiving the UCD message and the MAP message from the CMTS; and
calculating an available bandwidth associated with each at least upstream channels respectively.

10. The method of claim 6, further comprising performing by the cable modem operations of
calculating empty time-slots of each upstream channel of the one or more upstream channels; and
calculating an available bandwidth of each upstream channel based at least in part on the numbers of empty time-slots.

11. An article of manufacture comprising:
a machine-accessible medium including thereon sequences of instructions that, when executed, cause a device that shares one or more upstream channels with other devices to:
calculate an available bandwidth of a first upstream channel based at least on upstream channel bandwidth data transmitted from a remote system;
determine whether based, at least in part on particular data, an upstream channel data transfer rate can be improved over a current data transfer rate of the first upstream channel from the device to the remote system, wherein the particular data comprise the device's transmit queue capacity data, the upstream channel bandwidth data transmitted from the remote system, or both; wherein determining whether the transmit queue capacity data indicates that the transmit queue is full comprises:
monitoring a first number of receipt failure indicators transmitted from the remote system;
comparing the first number of receipt failure indicators to a second number; and
indicating the transmit queue is full if the first number is larger than the second number; and
improve, if the upstream channel data transfer rate can be improved, the upstream channel data transfer rate based, at least in part, on the particular data.

12. The article of manufacture of claim 11, wherein the device that shares the one or more upstream channels with other devices comprises a cable modem.

13. The article of manufacture of claim 12, wherein the remote system comprises a cable modem termination system (CMTS).

14. The article of manufacture of claim 13, wherein the sequences of instructions that, when executed, cause the device to determine whether the upstream channel data transfer rate can be improved comprise sequences of instructions that, when executed, cause the device to determine whether the transmit queue capacity data indicates that the transmit queue is full.

15. The article of manufacture of claim 14, wherein the sequences of instructions that, when executed, cause the device to improve by the device the upstream channel data transfer rate based, at least in part, on the particular data comprise sequences of instructions that, when executed, cause the device to:
if the transmit queue capacity data indicates that the transmit queue is full:
determine whether a capacity of the transmit queue is at a maximum capacity; and
increase the capacity of the transmit queue, if the capacity is not at the maximum capacity.

16. The article of manufacture of claim 14, wherein the sequences of instructions that, when executed, cause the device to improve by the device the upstream channel data transfer rate based, at least in part, on the particular data comprise sequences of instructions that, when executed, cause the device to:
if the transmit queue capacity data indicates that the transmit queue is full:
determine whether a capacity of the transmit queue is at a maximum capacity; and
initiate a service flow, if the capacity of the transmit queue is at the maximum capacity.

17. The article of manufacture of claim 14, wherein the sequences of instructions that, when executed, cause the device to determine whether the upstream channel data transfer rate can be improved comprise sequences of instructions that, when executed, cause the device to:
receive the UCD message from the CMTS for each upstream channel, including the first upstream channel the cable modem is using;
receive the MAP message from the CMTS for each upstream channel;
calculate an available bandwidth of each upstream channel based, at least in part, on the UCD message and the MAP message; and
determine whether a different channel has more bandwidth that the first upstream channel.

18. The article of manufacture of claim 17, wherein the sequences of instructions that, when executed, cause the device to improve the upstream channel data transfer rate based, at least in part, on the particular data comprise sequences of instructions that, when executed, cause the device to switch to the different upstream channel, if the different upstream channel has more available bandwidth than the first upstream channel.

19. The article of manufacture of claim 13, wherein the bandwidth data comprises an upstream channel descriptor (UCD) message and an upstream bandwidth allocation map (MAP) message.

20. An apparatus, comprising:
an improvement determination unit (IDU),
to calculate an available bandwidth of a first upstream channel based at least on upstream channel bandwidth data transmitted from a remote system; and
to determine, based at least in part on particular data, whether an upstream channel data transfer rate can be improved over a current data transfer rate of the first upstream channel to the remote system, wherein the particular data comprise the apparatus's transmit queue capacity data, the upstream channel bandwidth data transmitted from the remote system, or both; wherein determining whether the transmit queue capacity data indicates that the transmit queue is full comprises:
monitoring a first number of receipt failure indicators transmitted from the remote system;
comparing the first number of receipt failure indicators to a second number; and
indicating the transmit queue is full if the first number is larger than the second number; and an improvement unit, coupled with the IDU, to improve, if the upstream channel data transfer rate can be improved, the upstream channel data transfer rate based, at least in part, on the particular data.

21. The apparatus of claim 20, wherein the apparatus comprises a cable modem.

22. The apparatus of claim 21, wherein the remote system comprises a cable modem termination system (CMTS).

23. A system, comprising:
   a cable modem termination system, to transmit and receive data packets;
   customer premise equipment (CPE), to receive the data packets from cable modem termination system (CMTS) and transmit the data packets to the CMTS;
   a cable modem, coupled with the CMTS and the CPE, to determine whether, based at least in part on particular data, an upstream channel data transfer rate can be improved over a current data transfer rate of the first upstream channel from the cable modem to the CMTS, wherein the particular data comprise the device's transmit queue capacity data, the upstream channel bandwidth data transmitted from the CMTS, or both; wherein determining whether the transmit queue capacity data indicates that the transmit queue is full comprises:
      monitoring a first number of receipt failure indicators transmitted from the remote system;
      comparing the first number of receipt failure indicators to a second number; and
      indicating the transmit queue is full if the first number is larger than the second number; and
      improve, if the upstream channel data rate can be improved, the upstream channel data transfer rate based, at least in part, on the particular data; and
   a coaxial cable, to couple the cable modem with the CMTS and transmit the data packets between the cable modem and the CMTS.

24. The system of claim 23, wherein the cable modem is integrated with the CPE.

* * * * *

UNITED STATES PATENT AND TRADEMARK OFFICE
CERTIFICATE OF CORRECTION

| | | |
|---|---|---|
| PATENT NO. | : 7,668,098 B2 | Page 1 of 1 |
| APPLICATION NO. | : 10/600519 | |
| DATED | : February 23, 2010 | |
| INVENTOR(S) | : Murphy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1632 days.

Signed and Sealed this

Fourth Day of January, 2011

David J. Kappos
*Director of the United States Patent and Trademark Office*